July 3, 1945.  C. W. TURNER ET AL  2,379,842

THYROPROTEIN COMPOSITION AND METHOD OF MAKING THE SAME

Filed April 30, 1942

INVENTORS.
Charles W. Turner
Ezra P. Reineke
BY Thos. E. Scofield
ATTORNEY.

Patented July 3, 1945

2,379,842

UNITED STATES PATENT OFFICE 2,379,842

THYROPROTEIN COMPOSITION AND METHOD OF MAKING THE SAME

Charles W. Turner and Ezra P. Reineke, Columbia, Mo., assignors to American Dairies, Inc., Kansas City, Mo., a corporation of Maryland, and The Quaker Oats Company, Chicago, Ill., a corporation of New Jersey Application April 30, 1942, Serial No. 441,116

8 Claims. (Cl. 260—112)

Our invention relates to a synthetic thyroprotein composition and a method of making the same.

This application is a continuation-in-part of our copending application, Serial No. 326,422, filed March 28, 1940, now U. S. Patent 2,329,445.

An important object of our invention is the provision of a synthetic thyroprotein food composition made by combining iodine and skim milk or other proteinaceous material containing the amino acid tyrosine, low or devoid of fat, the composition being transformed from the starting protein containing tyrosine to a protein in which the tyrosine has been converted completely or in part to the amino acid thyroxine still as a component part of the starting protein. The transformed synthetic composition is a thyroprotein having new properties not present in either of the original ingredients. These new properties are demonstrated upon the injection of the preparation into suitable test animals such as the tadpole, etc., and by such tests demonstrate that the synthetic thyroprotein food composition has been brought to an active state by the methods hereinafter disclosed without first having been digested either by chemicals or enzymes in vitro. However, the new thyroprotein food composition may be digested by chemicals or enzymes in vitro and demonstrates physiological activity in the test animal or the separation of the synthetic amino acid thyroxine may be made by methods known to the art.

In brief, the invention resides in the preparation of a synthetic thyroprotein having physiological activity by the iodination of protein containing tyrosine, the novelty residing primarily in the discovery that native proteins containing the amino acid tyrosine can be altered by suitable chemical treatment to form the amino acid thyroxine as a component part of the protein molecule. Further novelty resides in the recognition that the formation of synthetic thyroprotein develops by two steps each of which must be carefully controlled to obtain maximum physiological activity or a maximum conversion of the amino acid tyrosine to thyroxine.

In the first step, the novelty of our invention resides in the recognition of the degree of iodination necessary to obtain maximum activity and the application of tests to determine and thereby limit iodination within this proper range.

In the second step, the novelty of our invention resides in the recognition of the influence of the proper temperature and the catalytic effect of certain metals in promoting the conversion to thyroxine of the iodinated products formed in the first step.

In the drawing forming a part of this specification,

Figure 1:
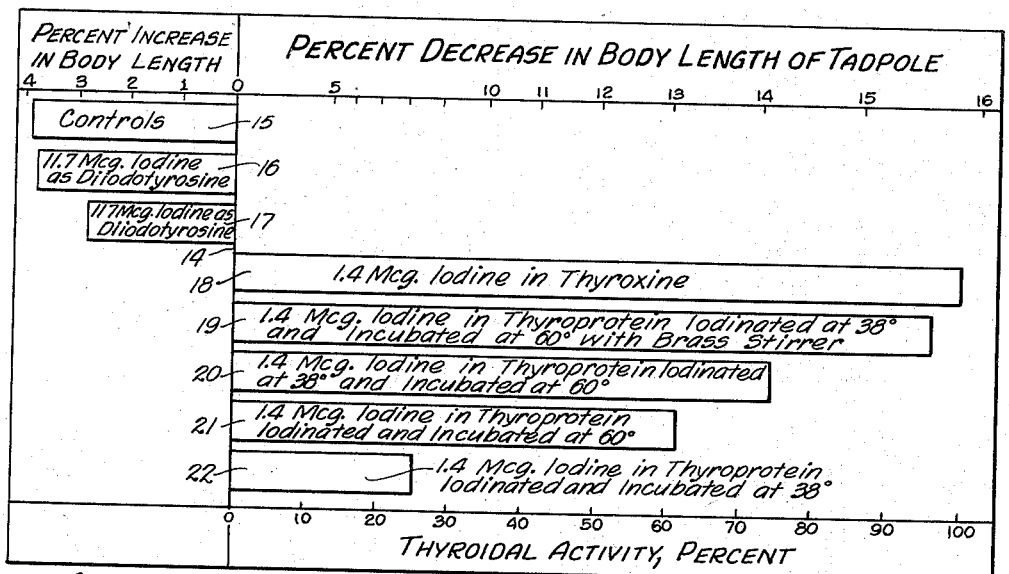
Fig. 1 is a graph illustrating the effect on tadpoles of a thyroprotein composition embodying our invention, this test being recognized in the art as a specific test for thyroidal activity.

One method of obtaining our product is as follows: Pulverized iodine is added slowly to an aqueous solution of a protein containing tyrosine, the solution having a pH value of 6.8 to 8 and being held at a temperature of 30°–45° C. Sodium bicarbonate contained in the solution acts as a buffer and neutralizes hydriodic acid formed as a side reaction. After the requisite amount of iodine has been added, the solution is placed in an incubator and held at a temperature of 50°–100° C. for 12 to 18 hours. During the incubation period, the solution is continuously stirred with a rod of a metal such as copper, tin, zinc, brass, or combinations of these metals. The metal apparently has a catalytic effect on the solution and substantially reduces the incubation period. The iodinated protein is then removed from the solution, dried and ground to a fine powder. The potency of the final product is dependent upon the amount of iodine added to the solution and upon the manner in which the solution is treated after the iodine has been added. If the product is prepared in the manner hereinafter set forth in detail it will approach if not equal the potency of thyroxine when the two are compared on the basis of their iodine content.

Thus, our food composition is composed of two essential ingredients, protein and iodine. We have found skim milk to be a suitable protein. However, it is to be understood that other proteins such as the proteins of milk, casein or albumen; blood serum or its proteins, albumin and globulin; egg albumen; meat meal or its protein, or proteins from other animal sources; or plant proteins such as are found in cottonseed meal, gluten meal, soybean meal, peanut meal, cocoanut meal or other high protein foods may be substituted for skim milk. Molecular iodine may be used to iodinate the proteins or, if desired, a mixture of molecular iodine and KI in aqueous solution may be used.

It is well known that iodine is a physiologically active constituent in thyroxine. The iodine constituent similarly determines the potency or physiological activity of thyroprotein. Thus, the amount of iodine added to the solution during the iodination step is critical. If too much or too little iodine is mixed into the protein solution a thyroprotein of reduced potency is obtained. To obtain a thyroprotein having maximum physiological activity, it is essential that only sufficient iodine be added to substitute two atoms of iodine per molecule of tyrosine in the protein. This critical amount has been found to be approximately 4 to 6 atoms of iodine. It is necessary that this number of iodine atoms be added per molecule of tyrosine since a certain amount of hydriodic acid will be formed as a side reaction. The iodination of tyrosine proceeds by substitution according to the equation, $$\text{Tyrosine} + 2I_2 \rightarrow \text{diiodotyrosine} + 2HI$$

We have found that there are several ways of accurately determining when exactly the right amount of iodine has been added to the protein. One test is to slowly mix small amounts of iodine into the protein solution until a starch test for free iodine is obtained for five to ten minutes after the last addition of iodine. However, the starch test, while generally satisfactory, is not as accurate as the biuret or Millon test. The biuret and Millon tests are well known in the art and we do not claim to be the first to apply them to iodinated proteins. However, we have found that exactly the right amount of iodine has been added to the protein to produce a thyroprotein of maximum physiological activity when the Millon test becomes negative or when the biuret test changes from a violet to a blue or blue-violet coloration in the solution. We are the first to associate or correlate these tests with the development of maximum thyroidal activity and to establish the efficacy of these reactions to indicate the first step in thyroprotein formation. A description of both the biuret reaction and the Millon reaction will be found on page 278 of the text "Organic Chemistry" by Paul Karrer, published in 1938. By using these tests we are able to closely control the reaction of iodine and protein and to finally obtain an artificial thyroprotein which closely approaches, if not equals the efficacy of thyroxine when administered in a dosage sufficient to supply an equivalent amount of iodine.

When fed to thyroidectomized animals, the thyroprotein prepared by our process entirely replaces the natural secretion of the thyroid gland. Also, when fed in suitable amounts, it increases the metabolism, rate of milk production and growth of normal animals.

Proteins are very complex substances including in their make-up the amino acids tyrosine, histidine, tryptophane and cysteine. Apparently, the first iodine mixed with the protein results in the substitution of iodine on the tyrosine ring. If an excess of iodine is mixed into the protein, the imidazole ring of histidine is iodinated. With further iodination there is oxidation of the tryptophane and a part of the sulfur of the cysteine complex. If the iodination step is not stopped when just sufficient iodine has been added to substitute two atoms of iodine per molecule of tyrosine, a product of greatly decreased thyroidal activity will be produced. We do not fully understand why this is so but numerous tests have proven it to be true.

Figure 2:
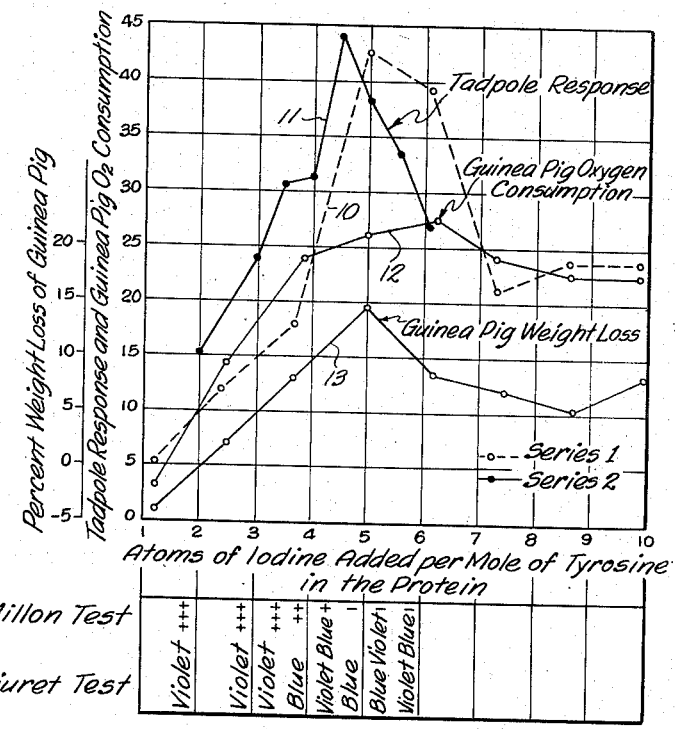
Fig. 2 is a graph illustrating the results obtained when proteins containing various amounts of iodine are administered to tadpoles and guinea pigs.

Attention is directed to Fig. 2 of the drawing wherein it is shown that the amount of iodine added to the protein is a critical factor in the formation of a thyroprotein having maximum thyroidal activity.

The weight loss of guinea pigs has been extensively used to determine thydoidal activity. Another method resides in the increase in oxygen consumption of guinea pigs stimulated by a selected dose of the thyroid-active material. Another recognized test to determine the thyroidal activity of a material is the effect of the material to stimulate metamorphosis of frog tadpoles.

Two series of tests were made to determine the response of tadpoles when thyroproteins containing various amounts of iodine are administered to them. For each of the two series of tests, samples of thyroprotein containing increasing numbers of iodine atoms per molecule of tyrosine were prepared. As shown by the abscissa numbers of the graph, Fig. 2, ten samples were prepared containing from 1 to 10 atoms of iodine. The ordinate numbers of the graph show the response of the tadpoles and guinea pigs to the respective samples of thyroprotein.

The manner in which the iodinated proteins were administered will now be described in detail. The first series of iodinated proteins were prepared by the direct iodination of skim milk. Seven hundred milliliters of skim milk were placed in a glass container. 5 grams of sodium bicarbonate were added to the milk solution and the container placed in a water bath maintained at 38° to 40° C. The solution was continuously and vigorously agitated by means of a glass stirring rod, attached to a motor stirrer. This mixture was divided into ten equal parts and progressively increasing amounts of finely powdered iodine were mixed into the separate solutions. For instance, one atom of iodine per molecule of tyrosine was added to one of the solutions, two atoms of iodine per molecule of tyrosine was added to another of the solutions, etc. When the selected amount of iodine had been added to each solution, the respective containers were closed with rubber stoppers having glass bearings to accommodate the stirrers. The closed containers and stirring apparatuses were placed in an incubator at 38° C. and continuously stirred for 18 to 20 hours. pH readings were taken with a glass electrode pH meter after addition of the bicarbonate, after addition of all the iodine, and after the incubation period. To recover the iodinated proteins from the solutions, dilute hydrochloric acid was added until the point of maximum precipitation was reached (pH 3.8 to 4.0). The precipitate was then washed with water which had been adjusted to pH 4.0. After washing, the precipitate was filtered, dried at room temperature and ground in a laboratory mill. Each member of the series was resuspended with a minimum amount of NaOH and dialyzed across a Cellophane casing in order to eliminate loosely combined iodine. The iodoprotein was then precipitated by the addition of hydrochloric acid, filtered, and dried.

In the second series of iodinated proteins, a casein was used that had been prepared in the laboratory from fresh, unpasteurized milk. Twenty-one grams of casein were placed in 700 ml. of distilled water to which 5 grams of sodium bicarbonate had previously been added. The mixture was stirred vigorously until the casein dissolved. The remainder of the process was then carried out in the manner described for the first series.

For the tadpole tests, large frog tadpoles (Rana pipiens) about 60 mm. in length were used. The rear legs of the tadpoles were fully formed, but still non-functional, and the front limb buds had not yet emerged. Such tadpoles are extremely sensitive to stimulation and furthermore can be injected quite readily. Since the response obtained with tadpoles will vary widely from time to time, depending upon their stage of development, environmental temperature, and possibly other factors, all of the tadpoles were injected on the same day. Some of the tadpoles were injected with a solution containing 1 atom of iodine per molecule of tyrosine, others were injected with a solution containing 2 atoms of iodine per molecule of tyrosine until samples from all of the solutions had been injected into different tadpoles. All of the tadpoles injected with samples of the same solution are designated as a test group. Final measurements of body length were made on the fourth day after injection. The test tadpoles were dosed with the same amount of material. Therefore, the actual response of the tadpoles gives a comparative measure of the potency of the respective preparations.

Healthy male guinea pigs weighing from 230 to 280 grams were used. In order to have the animals in a partially fasted state for daily measurements of metabolism, they were allowed access to food during the day only, and only after the oxygen consumption had been recorded. All food was removed from the pens at night. The diet consisted of 80 per cent of a grain mixture and 20 per cent "Cerogras" added as a vitamin supplement. This plan of treatment was used during the experimental period and also during the week preceding it.

To administer the thyroprotein to the guinea pigs a weighed amount of the iodinated protein was put in distilled water. The protein went into solution when two or three drops of saturated sodium carbonate was added and the solution violently agitated. Accurately measured quantities of the dissolved material were then given orally once daily for six days.

On the fourth and fifth days after beginning the dosage, measurements of oxygen consumption were made in a volumetric respiration apparatus. The percentage increase in oxygen consumption was calculated by comparing the treated animals with untreated animals of the same weight and maintained under the same conditions. Dosage of the animals was continued for six days and the final weights were taken on the seventh day after beginning treatment. Weight decreases were expressed as the per cent difference between the initial weight and the final weight of the animals.

The line designated by the numeral 10 in Fig. 2 shows graphically the results obtained when the first series of iodinated proteins were administered to tadpoles. This line indicates that maximum tadpole response was obtained when 5 atoms of iodine per molecule of tyrosine were added to the protein. The line designated by the numeral 11 shows graphically the results of the second series of tests. This line also indicates that maximum tadpole response is obtained when approximately 5 atoms of iodine per molecule of tyrosine were added to the protein.

The lines designated by numerals 12 and 13 in Fig. 2 indicate the effect on guinea pigs when thyroproteins containing varying amounts of iodine were administered to them. Line 12 illustrates the effect of the thyroproteins on the oxygen consumption of guinea pigs, and line 13 illustrates the effect of the thyroproteins on the weight of guinea pigs. Both are specific tests for thyroidal activity. Maximum oxygen consumption resulted when a protein containing 6 atoms of iodine per molecule of tyrosine was administered and a maximum weight loss was obtained when a protein containing 5 atoms of iodine per molecule of tyrosine was administered.

In tests of this nature, a five per cent experimental error is allowed. Thus, these tests clearly indicate that maximum thyroidal activity is obtained when from 4 to 6 atoms of iodine per molecule of tyrosine is mixed with the protein. This amount of iodine is the exact amount required to substitute 2 atoms of iodine on each molecule of tyrosine. When this amount of iodine has been added to the protein the Millon test becomes negative as shown at the bottom of Fig. 2. Also a sufficient amount of iodine has been added when the biuret test turns the solution from a violet to a blue or blue-violet color. Thus, these tests permit us to accurately control the iodination step of the process. If less amounts of iodine are added to the protein all of the tyrosine will not be iodinated and a thyroprotein having maximum thyroidal activity will not be obtained. On the other hand, if greater amounts of iodine are added to the protein so that other complexes in the protein molecule are iodinated, a thyroprotein having maximum thyroidal activity is not obtained. It is only when exactly the right amount of iodine is added to the protein that a thyroprotein having maximum thyroidal activity is obtained.

Under the conditions described above, it has been demonstrated that the amount of iodine added regulates the potency of the product. However, the maximum physiological potency, as estimated by the amount of the amino acid tyrosine available in the protein which could be converted to the amino acid thyroxine, was not attained. It appeared, therefore, that while suitable conditions for the first step, namely, iodination had been arrived at, the second step, namely, the conversion of the iodinated amino acid to form thyroxine was not optimal under the conditions previously described. We have found that if the protein is treated in the following manner, a synthetic thyro-protein will be produced which has a potency equivalent to that of the iodine in thyroxine, when administered in a dosage sufficient to to provide the same amount of iodine.

An aqueous solution containing 20 grams of casein and 5 grams of sodium bicarbonate was iodinated. 3.7 grams of finely powdered iodine was added slowly in small amounts over a period of three to four hours. As the last of the iodine was added, the Millon test became negative and free iodine could be detected in the mixture for some minutes. The sodium bicarbonate present in the solution constituted a buffer. It also neutralized the hydriodic acid formed as a side reaction. During the iodination step, the temperature of the solution was maintained at 30°–45° C. It is preferably maintained at 38°–40° C. In this instance, 3.7 grams of iodine was the exact amount required to substitute two atoms of iodine per molecule of tyrosine. After iodination, the solution was placed in an incubator where the temperature of the solution was elevated to 50°–100° C. The solution was maintained at that temperature for 12 to 24 hours. The length of incubation is a function of the temperature of the solution. A normal incubation period with the temperature of the solution at 60° C. was about 18 hours. During the incubation period, the solution was stirred continuously with a rod of metal composed of copper, tin, zinc, brass, or combinations of these metals. The metal stirring rod apparently acted as a catalyst and substantially reduced the incubation period. After the incubation period, the product was freed of inorganic salts such as iodides. Dialysis against running water has been found to be a satisfactory method. Another method is to purify the product by precipitation at its isoelectric point by the addition of dilute acid. The precipitate may then be removed by filtration or centrifuging. To obtain a pure product it is usually good practice to resuspend the filtrate in an alkali and reprecipitate by the addition of an acid. This precipitate is dried and ground to a fine powder.

Fig. 1 shows the relative importance of each of the above steps in the process and the critical nature of the temperatures indicated. In making the test shown graphically in Fig. 1, tadpoles were treated in the manner hereinafter described. The columns to the left of line 14 indicate percentage increase in the length of the tadpole. In tadpoles treated with thyroidal substances the decrease in body length is in proportion to the logarithm of the dosage employed. Hence the columns to the right of line 14 indicate the percentage decrease in the body length of tadpoles on an inverse logarithmic basis on the upper scale and the percentage of their activity in proportion to thyroxine on the lower scale. Columns 15, 16 and 17 indicate the increase in length of untreated tadpoles and tadpoles treated with 11.7 and 117 micrograms respectively, of iodine combined as diiodotyrosine. It will thus be noted that even when given in massive doses, diiodotyrosine produces no thyroidal effect. Column 18 to the right of line 14 indicates the decrease in body length of tadpoles when 1.4 micrograms of iodine combined in thyroxine was administered to them.

If the protein hereinabove described is iodinated at 38° C. and incubated at 38° C. for a period of from 12 to 24 hours, a thyroprotein will be obtained which, on an equal iodine basis is 25 per cent as potent as thyroxine, as shown by column 22. If the protein is iodinated at 60° C. and incubated at 60° C. a thyroprotein will be obtained which, on an equal iodine basis is 62 per cent as potent as synthetic thyroxine, as shown by column 21. If the protein is iodinated at 38° C. and incubated at 60° C. for a period of 12 to 24 hours, thyroprotein will be obtained which on an equal iodine basis is 74 per cent as potent as synthetic thyroxine, as shown by column 20.

If the protein is iodinated at 38° C. and incubated at 60° for a period of from 12 to 24 hours and the solution stirred continuously with a metal stirrer of the above mentioned character, a thyroprotein will be obtained that, on an equal iodine basis, is 96 per cent as potent as the iodine in thyroxine, as shown by column 19.

In experiments of this nature, a 5 per cent experimental error is recognized. It will thus be seen that a thyroprotein prepared in the manner last described closely approaches, if not actually equals the potency of thyroxine when given in a dosage sufficient to supply an equal amount of iodine.

In view of the foregoing, it appears that the formation of an artificial thyroprotein having maximum thyroidal activity is dependent upon a two-stage reaction. The first stage occurs when the protein is iodinated at 37°–40° C. During this period, an intermediate product is formed that can subsequently be converted into a thyroidally active material. The maximum formation or production of this intermediate product is dependent upon holding the iodine concentration to approximately that amount required to substitute two atoms of iodine per molecule of tyrosine in the protein. While a part of the intermediate substance may be converted to the active form during the iodination step, the tests indicate that all or substantially all of the intermediate product is converted to the active principle within a relatively short time by the incubation step at a temperature of between 50°–100° C. in the presence of a metal catalyst.

To our knowledge, all prior methods of making synthetic thyroxine produce an intermediate product which, when taken orally, is converted into thyroxine by the digestive action of the stomach and intestines. A product of this character cannot be administered by injection since it must be digested before it is converted into a thyroidally active substance. Our product, however, is a synthetic, thyroidally active, undigested thyroprotein. The thyroxine molecule has been converted from a molecule of tyrosine which was a component part of the original protein. Consequently, the thyroxine is linked to the protein molecule. Apparently the protein molecule holds the thyroxine in the active form. Therefore, our product may be administered either orally or by injection. When administered either way, our product will have a potency approximately that of thyroxine when given in dosages providing the same amount of iodine since it does not require digestion to convert it to a thyroidally active form. It has, among other valuable characteristics, the properties of a galactogogue or the ability of increasing the yield and the percentage composition of the most valuable constituents of milk of lactating animals and in particular dairy cows. To accomplish this function the food composition here described, upon digestion and absorption into the blood stream, has the characteristic also of increasing general body metabolism, and the use of blood precursors of milk by the mammary gland.

In addition, in suitable amounts, this food composition will favorably influence the growth rate of immature animals, the metabolic activity and general well being of animals with low general metabolism, the production of meat, wool, eggs, and the working and racing capacity of horses. More specifically our food composition influences favorably the rate of secretion by the anterior pituitary gland of hormones which influence the metabolism of fat, carbohydrates and proteins thereby reacting favorably on the physiological processes recited above.

Having thus described our process, we claim:

1. A method of making a synthetic thyroprotein comprising the steps of substituting iodine in a protein containing tyrosine until the Millon test becomes negative at a temperature of 30°–45° C., and incubating the iodinated protein in the presence of a catalyst at a temperature of 50°–100° C. for 12 to 24 hours.

2. A method of making a synthetic thyroprotein comprising the steps of substituting iodine in a protein containing tyrosine until the Millon test becomes negative, maintaining the protein at a temperature of 30°–45° C. during the iodination step and placing the iodinated protein in an incubator having a temperature of 50°–100° C. for 12 to 24 hours.

3. A method of making a synthetic thyroprotein comprising the steps of substituting iodine in a protein containing tyrosine until the biuret test yields a violet-blue color at a temperature of 30°–45° C., and incubating the iodinated protein in the presence of a catalyst at a temperature of 50°–100° C. for 12 to 24 hours.

4. A method of making a synthetic thyroprotein comprising the steps of substituting iodine in a protein containing tyrosine until the biuret test yields a violet-blue color at a temperature of 30°–45° C., and placing the iodinated protein in an incubator having a temperature of 50°–100° C. for 12 to 24 hours.

5. A method of making a synthetic thyroprotein comprising the steps of iodinating a protein containing tyrosine, maintaining the protein at a temperature of 30°–45° C. during the iodination step and the iodinated protein in the presence of a catalyst to a temperature of 50°–100° C. for 12 to 24 hours.

6. A method of making a synthetic thyroprotein comprising the steps of iodinating a protein containing tyrosine, maintaining the protein at a temperature of 30°–45° C. during the iodination step, and placing the iodinated protein in an incubator having a temperature of 50°–100° C. for 12 to 24 hours.

7. A method of making a synthetic thyroprotein comprising the steps of substituting iodine in a protein containing tyrosine until the Millon test becomes negative, and then incubating the iodinated protein at a temperature of 50°–100° C. for 12 to 24 hours.

8. A method of making a synthetic thyroprotein comprising the steps of substituting iodine in a protein containing tyrosine until the Millon test becomes negative, and then incubating the iodinated protein in the presence of a catalyst at a temperature of 50°–100° C. for 12 to 24 hours.

CHARLES W. TURNER.
EZRA P. REINEKE.